US008694675B2

(12) United States Patent
Wang et al.

(10) Patent No.: US 8,694,675 B2
(45) Date of Patent: Apr. 8, 2014

(54) GENERALIZED DUAL-MODE DATA FORWARDING PLANE FOR INFORMATION-CENTRIC NETWORK

(75) Inventors: Guo Qiang Wang, Santa Clara, CA (US); Ravishankar Ravindran, San Jose, CA (US); Xinwen Zhang, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 223 days.

(21) Appl. No.: 13/369,763

(22) Filed: Feb. 9, 2012

(65) Prior Publication Data

US 2013/0060962 A1 Mar. 7, 2013

Related U.S. Application Data

(60) Provisional application No. 61/530,288, filed on Sep. 1, 2011.

(51) Int. Cl.
*G06F 15/173* (2006.01)
*H04L 12/56* (2006.01)

(52) U.S. Cl.
CPC .................................. *H04L 45/306* (2013.01)
USPC ........... 709/238; 709/206; 709/207; 709/229; 709/232

(58) Field of Classification Search
CPC .................................................... H04L 45/306
USPC .................. 709/206, 207, 219, 229, 232, 238
See application file for complete search history.

(56) References Cited

U.S. PATENT DOCUMENTS

| 2009/0285209 | A1 | 11/2009 | Stewart et al. | |
|---|---|---|---|---|
| 2011/0090908 | A1 | 4/2011 | Jacobson et al. | |
| 2012/0136945 | A1* | 5/2012 | Lee et al. | 709/206 |
| 2013/0166668 | A1* | 6/2013 | Byun et al. | 709/207 |
| 2013/0166695 | A1* | 6/2013 | Lee | 709/219 |
| 2013/0173822 | A1* | 7/2013 | Hong et al. | 709/232 |

FOREIGN PATENT DOCUMENTS

| CN | 102045252 A | 5/2011 |
|---|---|---|
| EP | 2120419 A2 | 11/2009 |

OTHER PUBLICATIONS

Xiao, L. "Future Internet Architecture—Content-Centric Networks," Telecommunications Science, vol. 26 No. 5, May 2010, pp. 1-7.
Foreign Communication From a Counterpart Application, PCT Application PCT/CN2012/080934, International Search Report dated Dec. 13, 2012, 7 pages.

(Continued)

*Primary Examiner* — Michael Y Won
(74) *Attorney, Agent, or Firm* — Conley Rose, P.C.; Grant Rodolph; Jonathan K. Polk

(57) ABSTRACT

A networking system comprising a content router for an information-centric network (ICN) comprising a content store (CS), a pending interest table (PIT), a forwarding information base (FIB), and a plurality of interfaces, and configured to receive and forward interest from one or more users and data from one or more applications via the interfaces using a dual-mode data forwarding plane, and a plurality of next hop nodes of the ICN coupled to the content router and configured to forward the interest and data to the content router via the interfaces, wherein the dual-mode forwarding plane forwards the interest and data using the FIB without the CS and PIT for conversational traffic and using the CS, PIT, and FIB for content dissemination traffic.

20 Claims, 15 Drawing Sheets

(56) References Cited

OTHER PUBLICATIONS

Foreign Communication From a Counterpart Application, PCT Application PCT/CN2012/080934, Written Opinion dated Dec. 13, 2012, 4 pages.

"Motorblur," Motoblur—Wikipedia, the free encyclopedia, http:/en.wikipedia.org/wiki/MOTOBLUR, downloaded from the Internet Feb. 8, 2012, 2 pages.

Motorblur—Motorola Mobility, Inc. USA, http://www.motorola.com/Consumers/US-EN/Consumer-Product-andServices/MOTOBLUR, downloaded from the Internet Feb. 8, 2012, 2 pages.

\* cited by examiner

GENERALIZED DUAL-MODE DATA FORWARDING PLANE FOR INFORMATION-CENTRIC NETWORK

CROSS-REFERENCE TO RELATED APPLICATIONS

The present application claims the benefit of U.S. Provisional Patent Application No. 61/530,288 filed Sep. 1, 2011 by Guo Qiang Wang, et al. and entitled "A Generalized Dual-Mode Data Forwarding Plane for Information-Centric Network," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In a content oriented network (CON), a content router is responsible for routing user requests and content to proper recipients. In the CON, also referred to as an Information-Centric Network (ICN), a domain-wide unique name is assigned to each entity that is part of a content delivery framework. The entities may comprise data content, such as video clips or web pages, and/or infrastructure elements, such as routers, switches, or servers. The content router uses name prefixes, which can be full content names or proper prefixes of content names instead of network addresses, to route content packets within the content network. In the CON, content delivery including publishing, requesting, managing (e.g., modification, deletion, etc.) may be based on content name and not content location. One aspect of the CON that may be different from traditional Internet Protocol (IP) networks is the ability of the CON to interconnect multiple geographical points and cache content temporarily or store content on a more persistent basis. This may allow content to be served from the network instead of an original server, and thus may substantially improve user experience. The caching/storing may be used for real time data that is fetched by the user or for persistent data that belongs to the user or to a content provider, e.g., a third party provider.

SUMMARY

In one embodiment, a networking system comprising a content router for an ICN comprising a content store (CS), a pending interest table (PIT), a forwarding information base (FIB), and a plurality of interfaces, configured to receive and forward interest from one or more users and data from one or more applications via the interfaces using a dual-mode data forwarding plane, and a plurality of next hop nodes of the ICN coupled to the content router and configured to forward the interest and data to the content router via the interfaces, wherein the dual-mode forwarding plane forwards the interest and data using the FIB without the CS and PIT for conversational traffic and using the CS, PIT, and FIB for content dissemination traffic.

In another embodiment, the disclosure includes a network component comprising a transmitter/receiver (transceiver) configured to receive and forward an interest protocol data unit (PDU) and a data PDU that indicate a forwarding mode, a memory comprising a CS for caching content, a PIT for tracking pending requests for content, a forwarding information base for associating content with one or more ports, and a processor configured to forward the interest PDU and the data PDU for sharable content traffic in non-expedite mode using the PIT and to forward the interest PDU and the data PDU for non-sharable content traffic in expedite mode using the FIB without the PIT.

In yet another embodiment, the disclosure includes a method implemented by a network component for forwarding interest and data traffic in an ICN, comprising, receiving via a receiver content interest or data, forwarding via a transmitter the content interest or data using a PIT if the content or interest data corresponds to content dissemination traffic, and forwarding via the transmitter the content interest or data using a FIB without the PIT if the content or interest data corresponds to conversational traffic.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
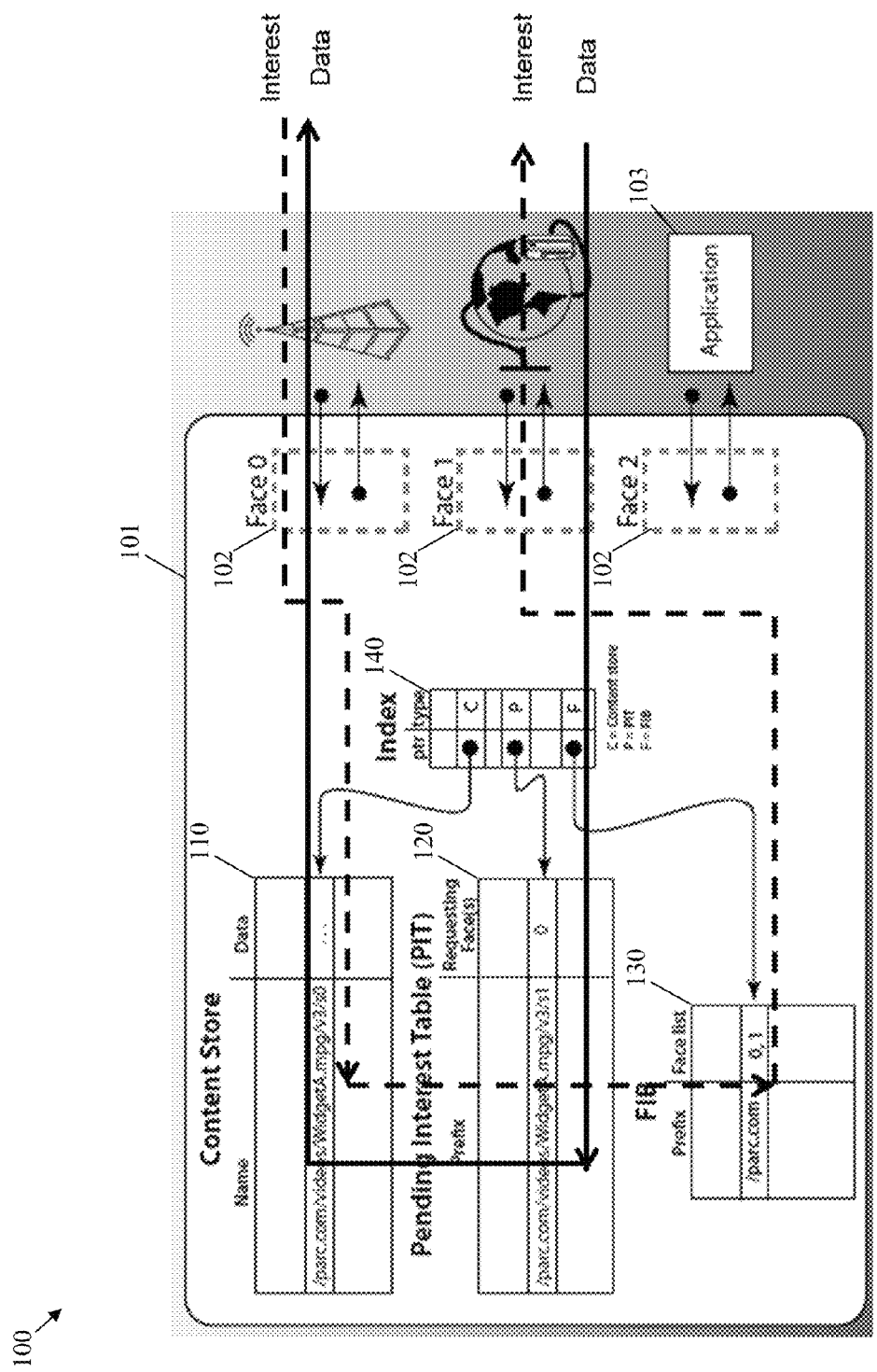
FIG. 1 is a schematic diagram of a typical single mode forwarding plane operation.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The CON or ICN is being considered as next generation Internet architecture to support both content dissemination traffic and conversational traffic. Different from today's Internet Protocol (IP) router, an ICN router may combine content routing, content computing power, and content local cache/storage capabilities. Similar to today's IP network, the ICN (as a new interworking layer) may be capable of supporting different traffic models, such as a conversational traffic model and a content dissemination model. The conversational model may include applications such as Voice/Video multimedia applications, Voice over IP (VoIP), instant messaging, social networking, transaction-based online banking, some Real-time Transport Protocol (RTP) connections for real-time communications, and/or other similar network traffic. The content dissemination model may comprise content retrieval and pushing events, such as broadcast or multicast media (e.g., IP Television) and/or similar traffic. Typically, the conversational model may correspond to a non-sharable communication between peers, while the dissemination model may correspond to sharable content distributed among many people or users.

In some ICN models, such as content-centric-network (CCN)/named data networking (NDN) proposals, the interworking functions may focus on the content dissemination model. In a CCN/NDN data forwarding plane, to efficiently support content dissemination, a stateful approach may be used to support name-based routing and forwarding. In the stateful approach, for every request, the content router may keep an in-network state (e.g., within a limited time) and the state may be per-content name based. For example, for a newly received interest, the CCN/NDN may generate and keep a state record in a PIT. The PIT may use this stateful information to cut off a looped-back interest, to aggregate other interests with the same content name, and to guide the backward path of the returned content data to the original requester. The PIT may also be used to support dynamic source routing when the ICN is applied to an ad hoc network (e.g., an infrastructure-less network without IP routing protocols).

Although the PIT may be useful or effective for supporting content distribution, the PIT may also introduce a disadvantage. Specifically, the state information of the PIT may be linear or proportional to the number of interests, and thus may have a substantial scalability issue when a conversational traffic model is considered, such as VoIP traffic or online banking services. For example, each exchanged VoIP traffic may need a corresponding end-to-end session where the exchanged information may not be shared with other parties, e.g., due to concerns of privacy. However, the PIT may not need to keep a record entry for VoIP traffic or other similar traffic. Using the PIT for VoIP traffic may not improve VoIP traffic handling and routing of such traffic and may lead to scalability issues.

Disclosed herein is a system and method for using a dual-mode data forwarding plane operation to support both the content/information dissemination model and the host-to-host conversational model. The dual-mode data forwarding plane operation may solve the PIT scalability issue and may be based on name-based routing and forwarding in an ICN or CON. The dual-mode data forwarding plane operation may comprise a first mode to process content dissemination, e.g., using the PIT, and a second mode to process host-to-host (e.g., two or multiparty hosts) non-shareable conversational traffic, such as voice/video traffic. The conversational traffic may be handled using a FIB for data routing, e.g., in both directions for both interest and content data. In the first mode, the packet may be processed at a first or slow path, which may include multiple operations, such as local caching data retrieval, PIT look up and update, and FIB look up and forwarding. In the second mode, the packet may be processed at a second or fast path, which may include FIB look up and forwarding without the other operations. To support this dual-mode operation, a new header for ICN PDU may be used, as described in detail below. The dual-mode data forwarding plane operation may handle both the dissemination traffic model and the conversational traffic model with flexibility and scalability and may be supervised by the traffic applications.

FIG. 1 illustrates a typical single mode forwarding plane operation 100, which may be used currently in ICNs or CON. For example, the single mode forwarding plane operation 100 may be used at the CCN/NDN data forwarding plane. The single mode forwarding plane operation 100 may be implemented by a content router 101 in the ICN or CON. The content router 101 may comprise a plurality of ports or interfaces 102 (e.g., Face 0, Face 1, Face 2, . . . ) and a plurality of forwarding tables or data structures for handling content data forwarding properly in the ICN or CON. The interfaces 102 may be coupled to one or more users or content subscribers (not shown) and to one or more services or applications 103, via a plurality of fixed (wired) links, wireless links, networks, Internet, and/or other components or systems.

The forwarding tables of the content router 101 may comprise a CS 110, a PIT 120, and a Forwarding Information Base (FIB) 130. The CS 110 may be used to associate interests (user requests for content) with corresponding data (requested content). For example, the CS 110 may comprise a "Name" column that indicates each received interest and a "Data" column that indicates the corresponding content data, which may be received and may be optionally or partially cached at the content router 101. The PIT 120 may be used to record and keep track of each received interest that is being served or pending (until the corresponding requested content data is received) by associating each interest with one or more requesting or receiving interfaces 102. For example, the PIT 120 may comprise a "Prefix" column that indicates each interest and a "Requesting Faces" column that indicates one or more receiving interfaces 102 for the interest. The FIB 130 may be used to associate interests with corresponding interfaces 102 on which the interests are received and forwarded. For example, the FIB 130 may comprise a "Prefix" column that indicates each interest and a "Face List" column that indicates the corresponding receiving and forwarding interfaces 102. The content router 101 may comprise a pointer table 140 or data structure that points to each of the three forwarding tables. For example, the pointer table 140 may comprise a "ptr" column that points to or indicates the location of each forwarding table, and a "type" column that indicates the name or type of each corresponding forwarding table (e.g., "C" for CS, "P" for PIT, and "F" for FIB).

In the single mode forwarding plane operation 100, an interest may be received at a first port or interface 102 (Face 0), for example via a wireless link from a user or a content subscriber (not shown). The interest may comprise a name prefix indicating the requested content and may be forwarded to or processed at the CS 110. An entry may be made in the CS 110 for the received interest using the indicated name prefix.

The name prefix may be entered in a new or empty row of the CS 110 under the "name" column. The interest may then be forwarded to or processed at the PIT 120. An entry may be made in the PIT 120 for the received interest using the indicated name prefix. The requesting or receiving interface 102 (Face 0) also may be indicated in the same entry. The name prefix may be entered in a new or empty row of the PIT 120 under the "Prefix" column, and Face 0 may be indicated in the same row under the "Requesting Faces" column. The interest may then be forwarded to or processed at the FIB 130. An entry may be made in the FIB 130 for the received interest using the indicated name prefix. The requesting interface 102 (Face 0) may also be indicated in the same entry. The name prefix may be entered in a new or empty row of the FIB 130 under the "Prefix" column, and Face 0 may be indicated in the same row under the "Face list" column. The interest may then be forwarded on a forwarding interface 102 (Face 1), e.g., to the next hop or content router (not shown).

When the requested content data is received, e.g., via the next hop on the forwarding interface 102 (Face 1), the name prefix indicated in the received data may be matched with a corresponding entry in the FIB 130. Thus, the receiving forwarding interface 102 (Face 1) for the data may be added to the "Face List" column of the matched entry. The name prefix may then be matched with a corresponding entry in the PIT 120. Accordingly, the content data may be forwarded on the interface(s) 102 (Face 0) indicated in the "Requesting Faces" column of the matched entry. The name prefix may also be matched with a corresponding entry in the CS 110, and the content data may be cached in the "Data" column of the matched entry. The content data may or may not be fully or partially cached according to caching criteria or scheme.

For content dissemination traffic, such as broadcast or multicast media (e.g., IP Television), the interest may be received on a plurality of interfaces 102, e.g., form a plurality of users or content subscribers. Thus, the "Requesting Faces" column of the matched entry may indicate a plurality of interfaces 102 on which the content may be sent (broadcast or multicast). However, for conversational traffic that is non-shareable, an entry may be made in the PIT 120 for each receiving interface 102. Hence, the number of entries may be proportional to the number of requesting users or parties, which may cause the PIT 120 to increase substantially in size as the number of users substantially increases. This may cause a scalability issue in larger networks (relatively large scale ICNs or CONs) for the PIT 120, and hence may decrease forwarding efficiency, increase cost, or both.

Figure 2:
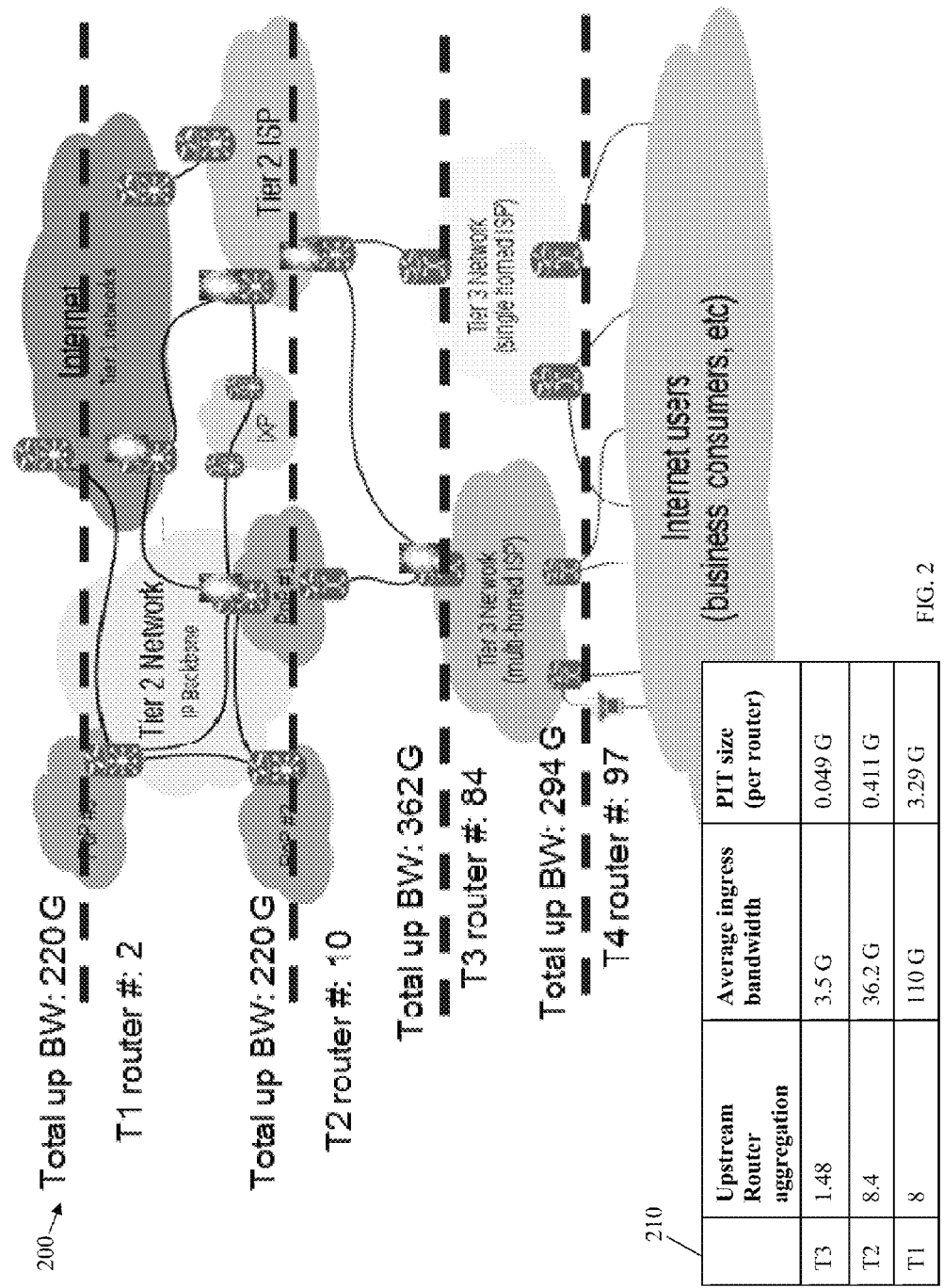
FIG. 2 is a schematic diagram of a typical single mode forwarding scenario.

FIG. 2 shows a typical single mode forwarding scenario 200 in a networking system, which may be based on the single mode forwarding plane operation 100. Data or content may be forwarded in the networking system using name prefixes. The networking system may comprise a plurality of networks (e.g., ICNs), which may comprise one or more tier one networks (e.g., for the Internet), one or more tier two networks (e.g., for IP backbone, Internet Service Provider (ISP), Internet Exchange Point (IXP), Point of Presence (POP), . . . ), and one or more tier three networks (e.g., for multi-homed ISP, single homed ISP, . . . ). The tier three networks may be closer to users (Internet users), the tier one networks may be at the Internet level, and the tier two networks may be intermediary networks between the tier one and three networks. The tier networks may comprise a plurality of content routers that may comprise corresponding PITs, such as the content router 101.

The scenario 200 shows a plurality of content routers, e.g., edge routers, across the networking system where the scalability of the PITs may suffer, e.g., where the number of entries in the PITs may be substantially high. For example, the PITs at the edge routers between the tier one and two networks and between the tier two and three networks may be non-scalable (as indicated by "explosion" graphics in FIG. 2). Specifically, the scenario corresponds to a plurality of network conditions, as shown in Table 210. The conditions include a relative upstream router aggregation, an average ingress bandwidths, and a PIT size (per router) for each group of tier networks (Tier 1, Tier 2, and Tier 3). The upstream router aggregation for the tier one and two networks (8.4 and 8, respectively) may be substantially greater than the upstream router aggregation of the tier three networks. The average ingress bandwidth may be larger for the tier one networks (110 Gigabytes (G)) and smaller for the tier three networks (3.5 G), in comparison to the second tier networks (36.2 G). The PIT size, which may be proportional to the average ingress bandwidth may also be larger for the tier one networks (3.29 G) and smaller for the tier three networks (0.049 G), in comparison to the second tier networks (0.411 G).

Figure 3:
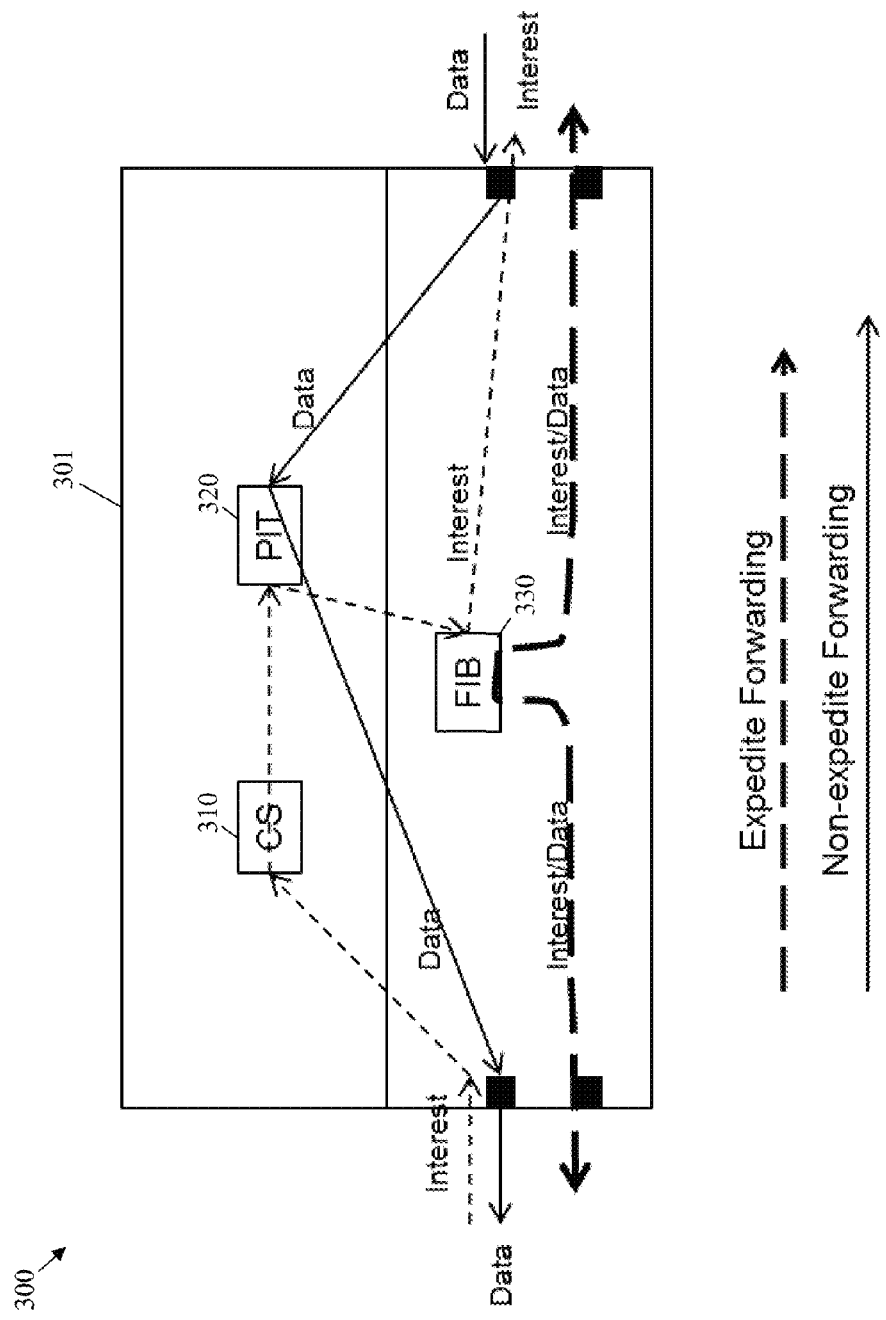
FIG. 3 is a schematic diagram of a dual-mode forwarding plane operation according to an embodiment of the disclosure.

FIG. 3 illustrates an embodiment of a dual-mode forwarding plane operation 300, which may be used in ICNs to resolve the scalability issue of the PITs and hence improve routing efficiency, e.g., at the CCN/NDN data forwarding plane. The dual-mode forwarding plane operation 300 may be implemented by a content router 301 in an ICN. The content router 301 may comprise a plurality of ports or interfaces for receiving and sending interest/data, and a plurality of forwarding tables or data structures for handling content data forwarding properly in the ICN, including a CS 310, a PIT 320, and a FIB 330. In the dual-mode forwarding plane operation 300, the traffic may be forwarded in expedite mode or non-expedite mode according to the type of traffic. Specifically, the conversational traffic (e.g., non-sharable traffic) may be forwarded using expedite mode, and content dissemination traffic (e.g., sharable traffic) may be forwarded using the non-expedite mode. Both the interest and data of each type of traffic may be forwarded according to expedite or non-expedite modes. The forwarding mode may be indicated in the received interest and data, such as using a PDU format as described below.

The non-expedite mode may be used for content dissemination or sharable traffic (for both interest and data) and may correspond to the forwarding plane operation 100. Thus, each of the CS 310, PIT 320, and FIB 330 may be used for receiving, handling, and forwarding interest and data as described in the forwarding plane operation 100. Since the content data may be shareable between multiple users or subscribers, the same entry in the PIT 330 may be shared for multiple receiving ports, which may avoid a scalability issue. The expedite mode may be used for conversational or non-sharable traffic (for both interest and data), where the FIB 330 may be used for receiving, handling, and forwarding interest and data without using the CS 310 and the PIT 320. By avoiding entries to the PIT 320 (and CS 310), the forwarding of interest and content may be expedited and the PIT scalability issue may be resolved. The FIB 330 may be used to associate interests with corresponding ports on which the interests are received and forwarded, similar to the FIB 130. When the requested content data is received, e.g., on a different port than the corresponding interest's receiving port, the name prefix indicated in the received data may be matched with a corresponding entry in the FIB 330. The interest receiving port in the matched entry may be used to forward the data and the port receiving the data may be added to the matched entry. In addition to improving the scalability of the PIT 320, the dual-mode forwarding plane operation 300 may provide flexibility in forwarding different types of content interest/data, and hence improve overall routing efficiency.

Figure 4:
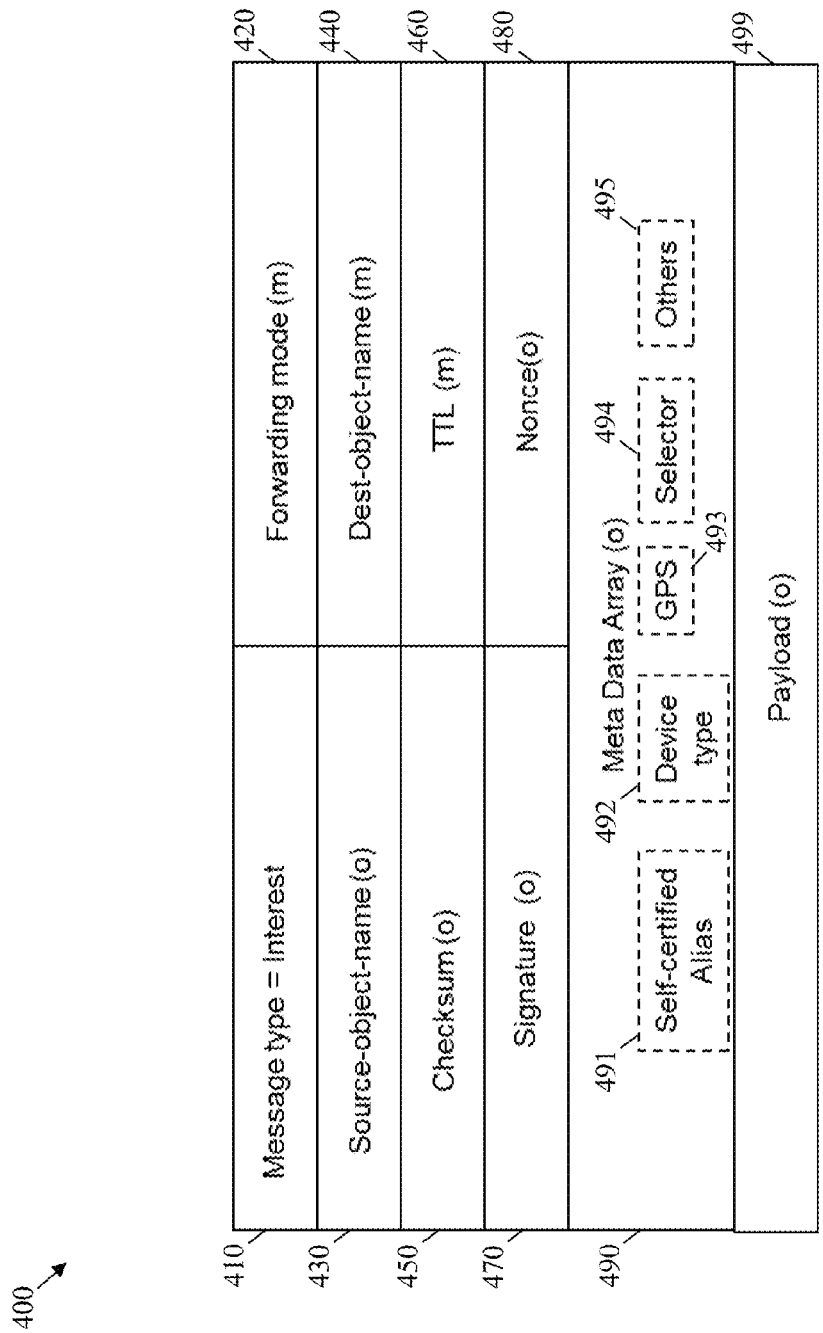
FIG. 4 is a schematic diagram of an embodiment of an interest PDU format.

FIG. 4 illustrates an embodiment of an interest PDU format 400 that may be used for sending interest in the dual-mode forwarding plane operation 300. The interest PDU format 400 may indicate the type of traffic that the interest belongs to (conversational or content dissemination traffic), and hence the traffic may be forwarded accordingly, as described above. The interest PDU may be received with or as part of the received interest message and may comprise a message type field 410, a forwarding mode field 420, a source object name field 430, a destination object name field 440, a checksum field 450, a time to kill or time to live (TTL) field 460, a signature field 470, a nonce field 480, a meta data list or array 490, and a payload field 499. The meta data list or array 490 may comprise a self-certified alias value or field 491, a device type value or field 492, a global positioning system (GPS) value or field 493, a selector value or field 494, and/or other values or fields 495 that may include a secured community identifier (ID) value or field. The fields above that precede the payload field 499 may represent or may be part of a header of the PDU.

Figure 5:
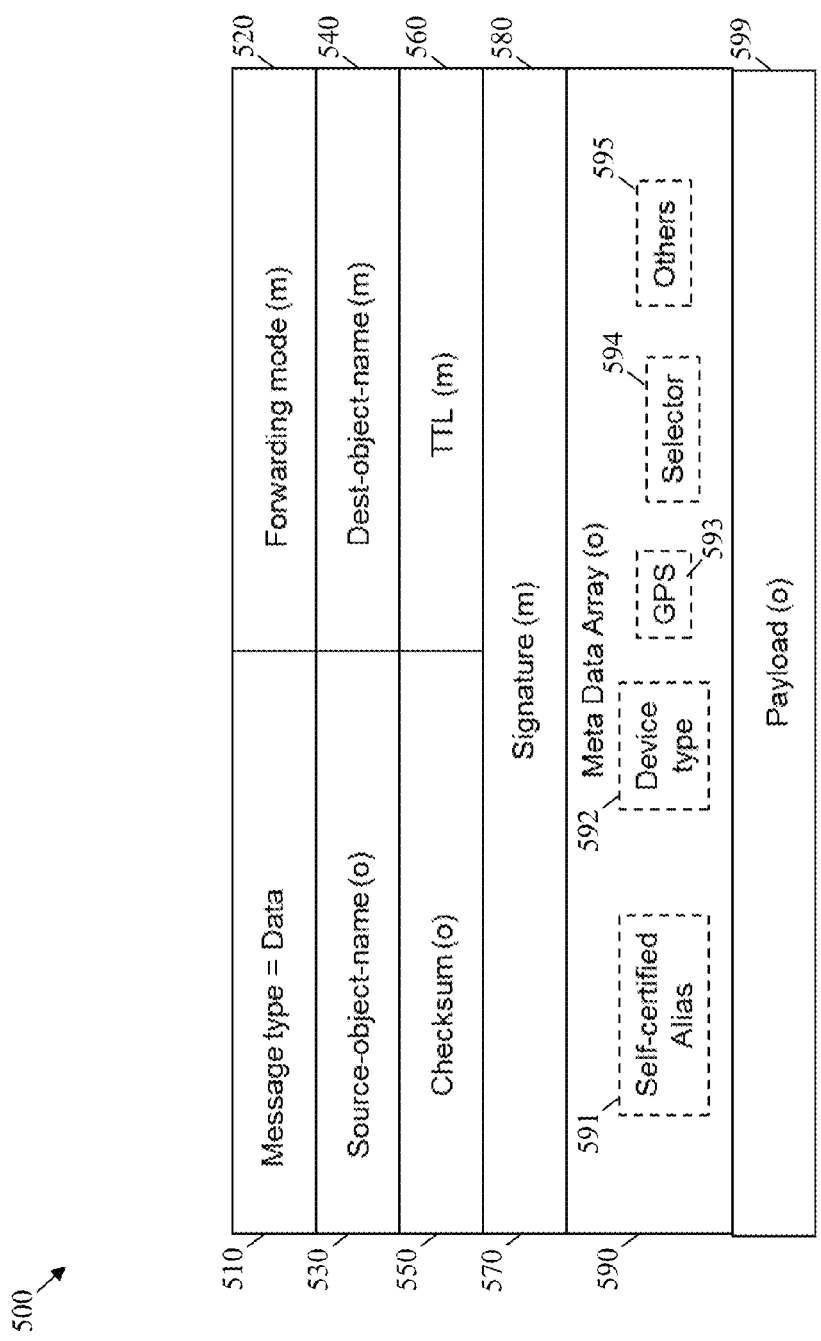
FIG. 5 is a schematic diagram of an embodiment of a data PDU format.

FIG. 5 illustrates another embodiment of a data PDU format 500 that may be used for sending data response in the dual-mode forwarding plane operation 300. The data PDU may be returned to a content router in response to a corresponding interest PDU (in the PDU format 400). The PDU format 500 may indicate the type of traffic that the data belongs to (conversational or content dissemination traffic), and hence the traffic may be forwarded accordingly. The data PDU may be received with or as part of the received content data and may comprise a message type field 510, a forwarding mode field 520, a source object name field 530, a destination object name field 540, a checksum field 550, a TTL field 560, a signature field 570, a meta data list or array 590, and a payload field 599. The meta data list or array 590 may comprise a self-certified alias value or field 591, a device type value or field 592, a GPS value or field 593, a selector value or field 594, and/or other values or fields 595 that may include a secured community ID value or field. The fields above that precede the payload field 599 may represent or may be part of a header of the PDU. The fields in the data PDU format 500 may be configured substantially similar to the corresponding fields in the interest PDU format 400, which are described below.

The payload 499 may comprise interest data and the payload 599 may comprise content data that may correspond to the interest data. The message type field 410 may comprise a flag that may be set to indicate whether the PDU is an interest or data PDU. Alternatively, the message type field 410 may comprise a determined value to indicate whether the PDU is an interest or data PDU. The interest may be routed on the destination object name in the destination object name field 440. In case of non-cacheable traffic, the interest may be routed on the destination object name and the corresponding data response may be routed using the source object name in the source object name 430. The message type field 510 may be configured similar to the message type field 410.

The forwarding mode field 420 may comprise a flag that may be set to indicate whether the PDU is forwarded using expedite or non-expedite mode. Alternatively, the forwarding mode field 420 may comprise a determined value to indicate whether the PDU is forwarded using expedite or non-expedite mode. The flag may be determined by the applications. For example, if the PDU is a non-cacheable (or non-sharable) content, such as Personalized VoIP/Video, the application layer may set the mode as expedite. In the case of Youtube™ streaming video, which may be a sharable content, the flag may be set as non-expedite. The forwarding engine (for the content router 301) may examine this flag to determine whether to look up the FIB 330 (based on source/destination object name) and dispatch the PDU to the designated ports or interfaces accordingly (expedite or fast mode) or to use the PIT operation, local cache operation, and/or some other computing processes (non-expedite or slow mode).

The PDU may carry a source object name (in the source object field 430) when the forwarding mode is set as expedite. For example, when a device is mobile and the applications on the device subscribe for a seamless mobility service, the applications may set the flag as non-expedite and use both source/destination object names for mobility control. When the device detects changing of attachment with base station, the forwarding mode may be set to allow the seamless anchoring point in the network to cache data for the specific user/application. This may allow the application to retrieve the data after the mobile device has re-anchored to a new point-of-attachment. The forwarding mode field 520 may be configured similar to the forwarding mode field 420.

The source object name field 430 may indicate the requester (or user) name, and the destination object name field 440 may indicate the requested object name. When the forwarding type is expedited, the source object name may be included in the interest PDU. Otherwise, using the source object name may be optional. The destination object name may be included in both expedite and non-expedite mode. For example, for voice communications, which may be non-sharable content, the source object name (e.g., a caller) in a data-response PDU (from a callee) may be used by the content router 301 with the FIB 330 to forward the message back to the object requestor.

To support the dual-mode forwarding plane operation 300, the content requesters or subscribers (and similarly the content producer) may be expected to publish the associated application prefixes that seek data response. This may allow the prefixes to be populated in the FIB 330, so that the data responses may be routed back. In the case of a sharable content (e.g. Youtube™ video), the interest PDU format 400 may not carry a source identifier (ID), and the returned content may be routed back via the PIT 320 lookup. When the forwarding flag (in the message type field 410) is set to expedite mode, the source object name may be set in the interest PDU for backward forwarding purposes. The source object name and the destination object name may be either structured names or flat names. The structured name may have a hierarchical format, such as a uniform resource identifier (URI). The flat name may have a digital format, which may be a bit string generated from a hash function. When a structured name is used, the PDU or packet may be forwarded to a default gateway router, where a domain name system (DNS) may be used to resolve the destination server, e.g., if the content router 301 cannot find the next hop to forward the PDU. The content router 301 may then forward the PDU to the destination server to get the content back. The source object name field 530 and the destination object name field 540 may be configured similar to the source object name field 430 and the destination object name field 440, respectively.

The checksum field 450 may comprise a value that may be verified to indicate the integrity of the received PDU. The checksum value may be used to check for errors in the header and payload parts of the PDU, for example to check if the PDU was corrupted in memory or storage. Setting the checksum in the PDU may require a reliable content relay between two routers (content routers). Otherwise, the transmission of the PDU may not be reliable. The checksum field 550 may be configured similar to the checksum field 450.

The TTL field 460 may indicate the life of the received PDU or packet, for instance to prevent a forwarding loop for the packet, to indicate the life time for the interest/data stored in a PIT or a local cache, or both depending on the setting of the forwarding mode. The TTL may have different interpretations in different forwarding modes. In expedite mode, the purpose of the TTL may be to cut off the forwarding loop when both the source object name and the destination object name in the PDU and FIB are used to supervise the forwarding. For example, a forward loop may be caused due to multi-path forwarding among content routers. In non-expedite mode, the TTL may be used to indicate how long an interest or data PDU may exist or remain valid in the PIT or local cache.

In expedite mode, the TTL may be used in both interest PDU and data PDU to prevent the forwarding loop. The TTL in this case may be set as a number of maximum allowed hops. During the forwarding, every hop (router) may reduce the TTL value by one unit until the value of about zero is reached. If the TTL value is about zero, the PDU may be dropped. In non-expedite mode, the TTL may be set as a unit of time-of-the-day (TOD), which may indicate the life time of the PDU. For example, a persistent interest with a relatively longer TOD may be stored in the PIT to support event pushing services in ICN (e.g., a subscriber may retrieve a non-existing content beforehand). A TTL in a data PDU may indicate how long the data may be stored in each local cache. Using this TTL, the content router may implement a policy-based decay function to purge the expired content within an ICN network. The TTL may be set by the applications. The TTL field 560 may be configured similar to the TTL field 460.

The signature field 470 may comprise a cryptographic hash function that may be based on the name and payload, e.g., hash(name, payload). The signature may be a signed credential that maintains the relationship between a destination object name, static metadata items, and/or the payload within a PDU. The receiver of the PDU may use this signature to verify the designated relationship (e.g., whether the content was from a trusted publisher). The nonce field 480 may comprise a random number and may be used to prevent message replay attacks. Using this field, the receiving router may keep track of the received PDUs and detect a situation where the same PDU is being received multiple times, which may signal a replay attack. The receiving router may drop the replayed (or retransmitted) PDU(s). The signature field 570 and the nonce field 580 may be configured similar to the signature field 470 and the nonce field 480, respectively.

The meta data array 490 may be a list of context-based parameters, computing functions, or a name-based pointer like web link to the computing functions. The meta data array 490 may be used to supervise/guide content forwarding, access, storage operation, security, and/or designated service processing operations. The self-certified alias value or field 491 in the meta data list or array 490 may be a public key or a hash of public key from a content publisher. When a requester sends an interest, the alias in this field may be sent in the interest PDU. When a data PDU is sent back in response, the data PDU may also carry an alias. The content router may validate if the alias is matched between the interest PDU and the data PDU to validate the source or origin of the publisher. A returned data PDU that comprises a non-matching alias may be dropped since such PDU may come from a fraud publisher.

The device type value 492 in the interest PDU may indicate the type of the requesting object (e.g., an iPhone™ or an iPad™). The GPS field 493 may indicate the geographical location (e.g., coordinates) of the requester (user device or application). The selector field 494 may comprise a service function pointer that may allow the receiving content router to implement one or more designated functions (e.g., when the data PDU is stored in a local cache) before the content is returned to a matched interest. The secured community ID may be used in interest and data PDUs to authorize access control policy. The meta data array 590, self-certified alias value or field 591, device type value or field 592, GPS value or field 593, selector value or field 594, and other values or fields 595 of the data PDU format 500 may be configured similar to their corresponding fields in the interest PDU format 400.

In an embodiment, when two content routers, such as the content router 301, establish an adjacent relationship, the routers may negotiate if a checksum value is needed to support reliable data transmission, e.g., at content layer interworking. Based on an application type, a user or end device may assign a source object name to build an interest PDU, as described above. For example, if the application is a voice application, the source object name may be carried in the PDU. Otherwise, if the application is, for example, to download a Youtube™ video, then the video name (e.g., URI) may be used as a destination name. The message type flag may be set accordingly (either interest or data). The TTL may be set either by the end device or by the first content router that the device is attached to. For example, if the interest is about a future event, then the TTL may indicate that the interest is a persistent interest to wait for an upcoming event. In data PDU, the signature may be generated properly, as described above. The forwarding type may be set accordingly. At least some meta data array fields may be carried in the PDU. For example, in the interest PDU, a secured community ID may be used for access control. A self-certified alias may also be used for source validation. The checksum may be calculated (if it is required), e.g., after setting the remaining fields in the PDU, and the PDU may then be sent to the first content router.

When the content router receives an interest with destination object name, the router may validate the checksum in the interest PDU. Accordingly, a damaged packet if detected may be dropped. The router may then check the forwarding mode. If the forwarding mode corresponds to an expedited object, the forwarding operation may be processed as fast path (or expedite mode), as described above. A forwarding engine (FE) of the content router may look up a corresponding FIB to determine to which next-hop interface(s) the packet may be forwarded. In this case, the TTL (e.g., the number of the hops) may be reduced by one unit. If the TTL is reduced to about zero, then the PDU may be dropped. If a match for the interest is not found in the FIB, based on policy, the packet may be dropped, sent out to all egress interfaces (e.g., anycast or flooding), or sent to a default gateway router. If the forwarding mode is set as non-expedite, then the forwarding operation may be processed at slow path (or non-expedite mode). In this case, if a match is found for the destination object name in the local cache, then the content may be sent back. A non-shareable application or a mobility agent may temporarily set the non-expedite mode (using a PDU) to enable content caching and support seamless mobility. Otherwise, the PIT per-name state may be updated, e.g., by creating a new entry or queuing the ingress interface number under the same name state that was previously established.

The TTL and the meta data received in the PDU may be stored in the PIT. A local timer may be used to decay the TTL. When the TTL is dropped to about zero, the corresponding interest may be removed from the PIT. After the PIT operation, the FE may look up the FIB to determine where the packet may be forwarded. Before sending the packet, the checksum may be recalculated since the content router may change some components of the PDU (e.g., the TTL). After finding the destination object for the PDU in the FIB, which may be a second content router or a publisher's device, a data PDU may be generated, as described above. Based on the forwarding type, the TTL may be used to prevent a forwarding loop (in expedite mode) or to define how long a content may exist in a local cache of the network (in non-expedite mode). The meta data in the PDU header may be used to support associated services. For example, a publisher may define a secured community ID to determine which interest may consume the data. The publisher may also associate a self-certified alias to enable the content router to validate the source of the content.

When a data PDU is received, the checksum of the PDU may be validated and the router's FE may check the forwarding mode as indicated in the PDU. Similar to the interest PDU, the forwarding operation may also be processed as fast path or slow path. In the slow or non-expedite mode, the payload of the PDU may be replicated at a local cache, and may be processed based on the associated meta data. For example, the content router may determine that only interests with matched secured community ID or alias may receive the data PDU returned to the requesters. As such, if the alias carried in the data PDU is not matched with any interest's alias in the PIT, then the PDU may be dropped (e.g., the data PDU may be sent from a fraud publisher). For authentic data PDUs, the PIT may be updated (according to the information in the data PDU) and the corresponding content data may be disseminated to all or a plurality of requesters based on the per-name state from the PIT.

A scheme similar to the above scheme for receiving and forwarding interest and corresponding content data may be used to support a push event notification operation. In the push event notification operation scenario, instead of pulling event data via sending interests, subscribers may populate their interested event prefix (e.g., via a content routing protocol) to one or more or every routers' FIB. Hence, the one or more routers may configure the event prefix to the routers' FIB. The event publishers may then use the event prefix as part of a destination object name and use meta data to indicate which router(s) may store the event. For example, a transient event may be expressed as a data PDU and expedited when a publisher pushes the event towards a subscriber. The event may be sent to an access router, where a device may be attached. During the dissemination process, a FE on one or more routers may use the associated FIB to forward the event data. In this case, the TTL (in the PDU) may be used to cut off or prevent a forwarding loop. Based on the meta data, the event may be pushed to the designated subscriber(s).

Figure 6:
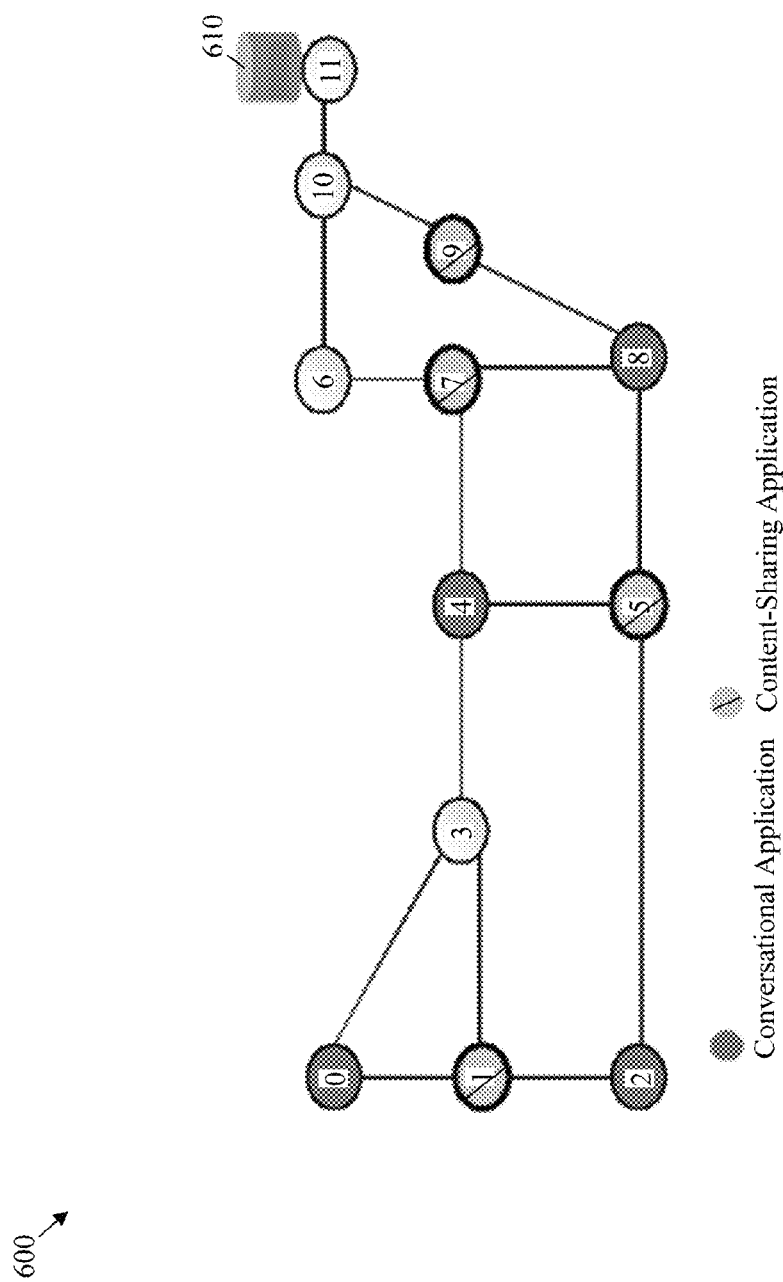
FIG. 6 is a schematic diagram of an embodiment of a simulation topology.

FIG. 6 illustrates an embodiment of a simulation topology 600 for an experimental simulation that is used to analyze the dual-mode forwarding plane operation 300 for ICNs. The simulation is used to compare the efficiency gained by operating a CCN in the dual-mode. The simulation topology 600 corresponds to an Internet2 abilene topology, as described in http://abilene.internet2.edu/, which is incorporated herein by reference. The simulation topology 600 is configured using the NS3-DCE environment which allows simulation analysis using real world protocol implementations, such as CCNx. The NS3-DCE environment is described by M. Lacage in a PhD thesis entitled "Outils dexperimentation pour la recherche en reseaux" at the University of Nice-Sophia Antipolis, Nov., 2010, which is incorporated herein by reference. The ccnx-0.4.0 release is used for this simulation. More details about the simulation are described by Ravishankar Ravindran, et al. in Hauwei internal publication, entitled "Supporting Dual-Mode Forwarding in Content Centric Network," Huawei Research Center, Santa Clara, Calif. (Ravindran, et al.), which is incorporated herein by reference as if reproduced in its entirety.

The simulation topology 600 comprises a plurality of interconnected nodes (e.g., content routers) that are labeled from 0 to 11. The nodes host a conversational application and a content-sharing (or content dissemination) application, as shown in FIG. 6. The traffic considered for analysis is a combination of content-sharing traffic (for the content-sharing application) and voice conversations traffic (for the conversational application). The interest routing is implemented according to a shortest path first logic.

The content-sharing application presents a model for traffic due to content sharing among users. The simulation topology 600 includes a node 11 that is configured as a repository node for the shareable contents. The node 11 is associated with a repository (repo) 610 for storing shared content. As described in detail by Ravindran, et al., the repository 610 is initialized with 2000 content objects, with a geometric mean size of 100 chunks. The content popularity is determined by the zipf distribution with an exponent parameter of 2, and the number of popularity classes K is set to 100. To keep the simulation time within practical limit, the parameters are a scaled down version of those considered by G. Carofiglio et al. in Technical Report, http://perso.rd.francetelecom.fr/muscariello/report-itc-transport.pdf, 2011, entitled "Modeling data transfer in content centric networking", which is incorporated herein by reference. In the simulation topology 600, the nodes 1, 5, 7, and 9 are selected to generate requests for shared content. The file sharing application is based on ccnd-sendchunks and ccncatchunks2 utilities included in CCNx release. The ccncatchunks2 is operated with a window size of 1.

The conversational application simulates point-to-point streamed conversational content. As described in detail by Ravindran, et al., the application is modeled as constant bit rate voice application with a packet generation rate of 50 packets/second (s) and voice payload of 160 bytes (B). A new CCNx utility was developed for this purpose. The utility implements a bi-directional voice session where interests and Data-responses are generated at the same rate. With reference to the simulation topology 600, the nodes 0, 2, 4, and 8 are selected to generate traffic for conversational content. In the default (or expedite) mode, the expiry of voice packets are set to 1 s or 5 s depending on the simulation scenario, and in dual-mode the voice packets are marked stale when they are forwarded.

Figure 7:
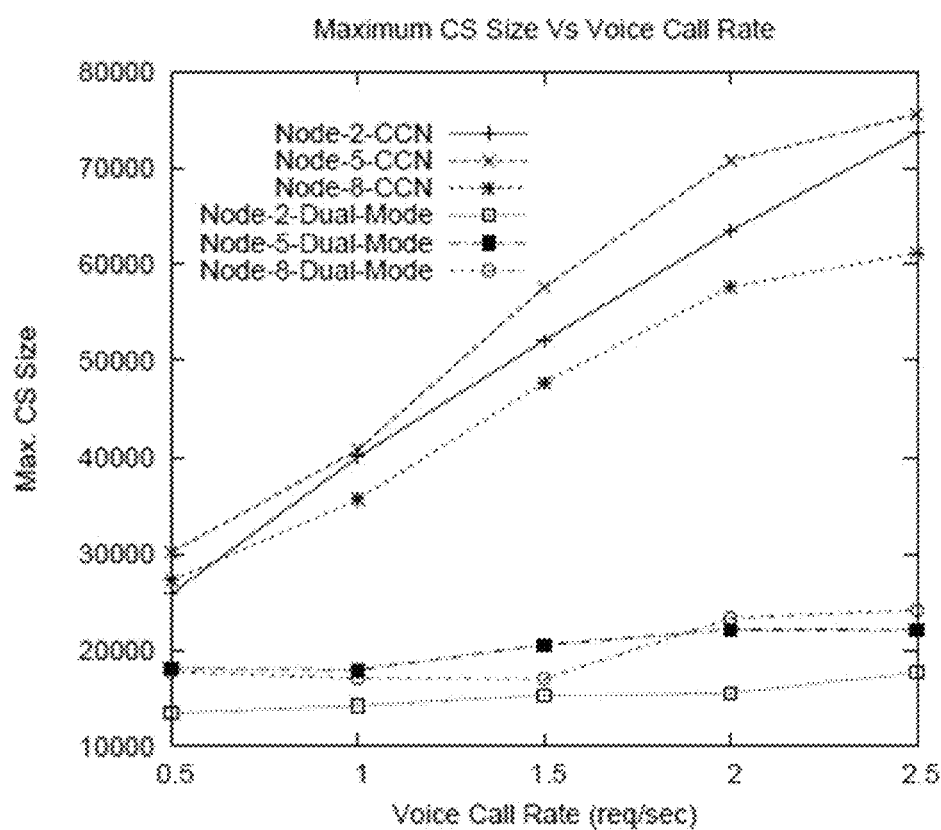
FIG. 7 is a chart of an embodiment of a relation between maximum CS size and voice call rate.

A plurality of performance metrics are collected from the simulation to compare the efficiency of expedite and non-expedite forwarding modes or schemes. The performance metrics include maximum CS size, maximum PIT size, cache hit ratio, miss rate, and average round-trip time (RTT). The RTT is the response time per chunk with respect to the application and is measured from when an interest is issued to the time when the data-response is received. FIG. 7 illustrates a relation 700 between maximum CS size and voice call rate that is obtained from the results or output values (parameters) of the simulation. The results correspond to nodes 2, 5, and 8, as the links (2→1), (5→2), (8→5) connecting these nodes have the highest link utilization due to the selected load and the interest routing logic.

The different curves of the relation 700 compare the performance of maximum CS size for varying load under the two forwarding modes. In the default or non-expedite mode, the maximum CS size increases with increasing rate of the voice calls. This is expected, as increasing call rate may cause more calls to be active per unit time, hence more voice content may be cached in the CS, which may increase the CS utilization in both edge and transit routers. The CS size may depend on the rate of incoming interests, which may cause nodes 5 and 8 to have larger CS than node 2. In the dual-mode, the voice data-response packets may bypass the CS processing, which may leave no memory of the packets in the edge or transit routers. This is represented in FIG. 7, where the CS cache size is only associated with the data-response resulting from the content-sharing application. This causes the CS size to remain about the same for increasing voice call rate.

Figure 8:
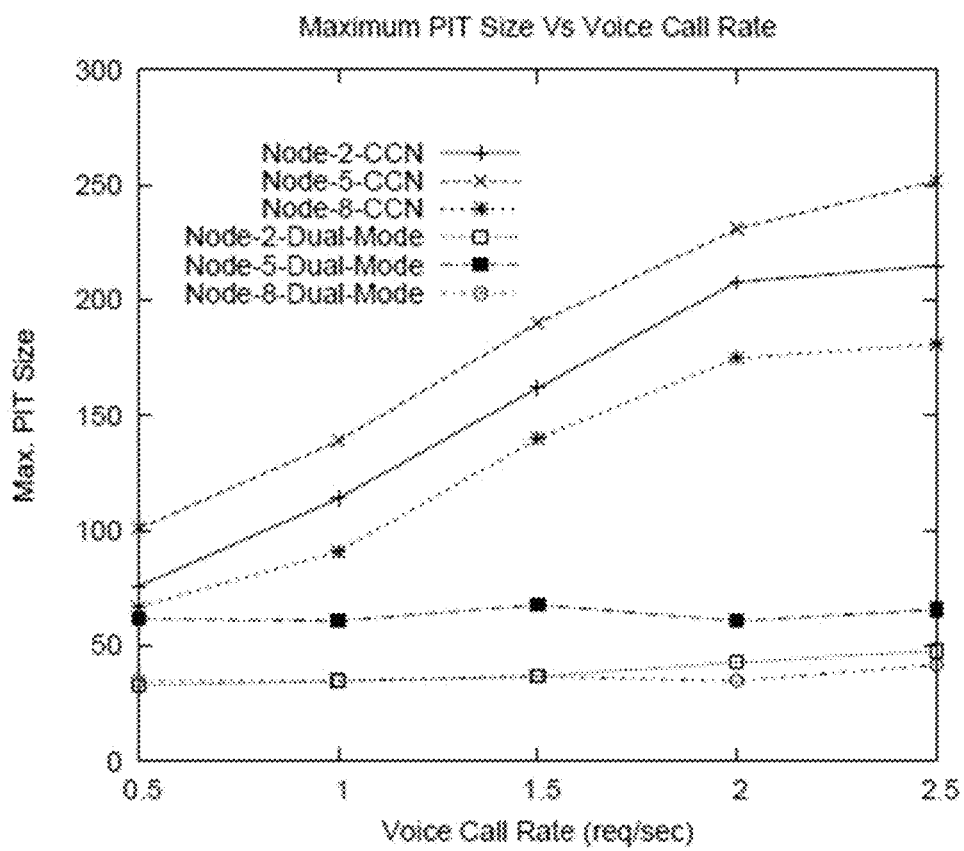
FIG. 8 is a chart of an embodiment of a relation between maximum Pending Interest Table (PIT) size and voice call rate.

FIG. 8 illustrates a relation 800 between maximum PIT size and voice call rate that is obtained from the results of the simulation to analyze the efficiency gained with respect to maximum PIT size. The behavior of maximum PIT size correlates with that of the maximum CS size for both the forwarding modes. The results are presented with respect to nodes 2, 5, and 8. The relation 800 shows that with increasing voice call rate, the PIT size grows proportionally in the default case but remains substantially unaffected in the dual-mode case. The cause may be that the expedited marked voice interests are subjected to fast-forwarding using the FIB bypassing the PIT processing. As in the CS case, the reason for the difference in PIT size for three nodes may be due to the interest arrival pattern and the interest routing logic in the network.

Figure 9:
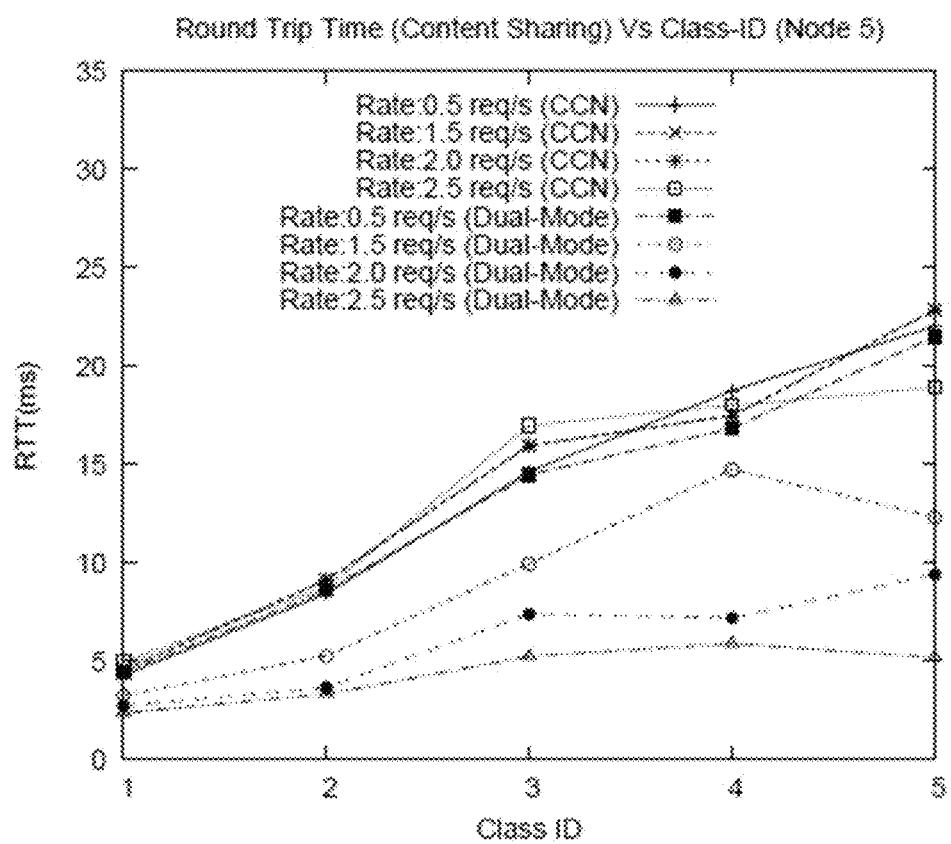
FIG. 9 is a chart of an embodiment of a relation between round trip time and class-id.

FIG. 9 illustrates a relation 900 between round trip time and class-id that is obtained from the results of the simulation. The relation 900 shows the average RTT performance for the content-sharing application using both forwarding modes. In both cases, the RTT performance increases with increasing class-id, as the probability of content miss increases with decreasing class popularity. Comparing the default to the dual-mode forwarding case, because of the improvement in cache hit rate for the dual-mode forwarding case, the RTT may improve too. The cause may be that the dual-mode forwarding eliminates (or substantially reduces) the contention for the CS resource benefiting the content-sharing application, which may result in better hit ratio and RTT.

Figure 10:
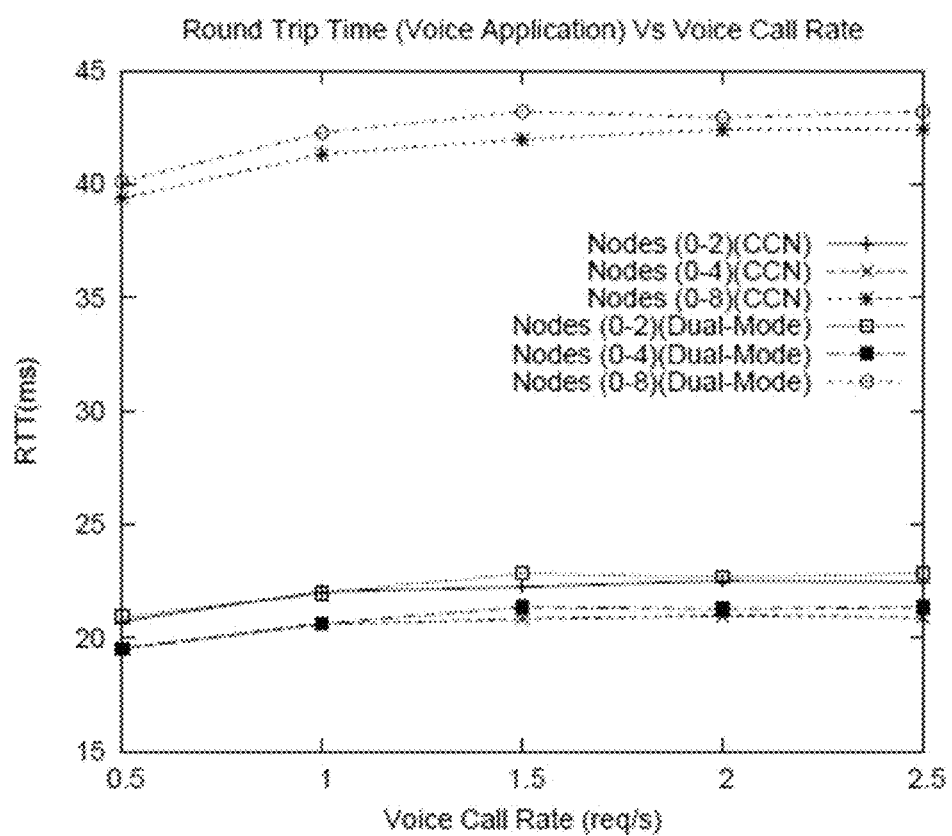
FIG. 10 is a chart of an embodiment of a relation between round trip time and voice call request rate.

FIG. 10 illustrates a relation 1000 between round trip time and voice call request rate that is obtained from the results of the simulation. The relation 1000 shows the performance of RTT for the voice application for the two forwarding modes. The results are presented with respect to node 0 which has voice sessions with nodes 2, 4, and 8. The difference in average RTT for node pairs (0, 2), (0, 4) and (0, 8) may be due to the increasing number of hops and higher utilization of in-path transit links. Specifically, for a single CCN node, an interest and corresponding data-response is observed to be in the range 4 to 5 milliseconds (ms). The simulation setup includes about 2 milliseconds (ms) delay per link, and the overhead factor due to the simulation setup rationalizes the RTT observations. Comparing the default to dual-mode, the voice application may not show improvement. The dual-mode is found to be as good or little worse than the default CCN case. This observation may be due to the CCNx's implementation of the CS, PIT, and the FIB as one logical data structure. This may prevent an efficient fast-path forwarding implementation to handle expedited content without significantly altering the protocol's implementation.

Figure 11:
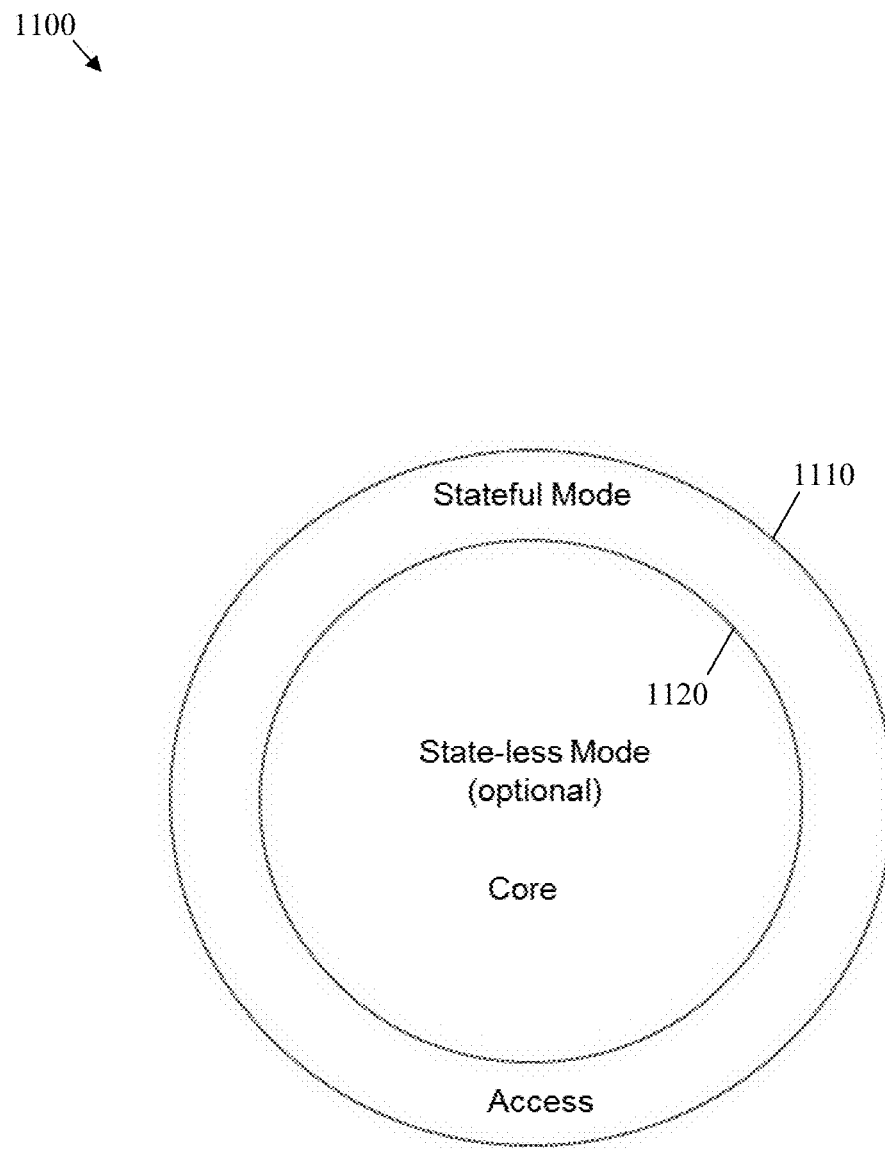
FIG. 11 is a schematic diagram of an embodiment of a hybrid-mode forwarding implementation.

FIG. 11 illustrates an embodiment of a hybrid-mode forwarding implementation 1100, which may be used in an ICN (e.g., CCN). The hybrid-mode forwarding implementation 1100 may use a statefull mode implementation 1110 and a state-less mode implementation 1120. The statefull mode operation 1110 may use a single mode forwarding operation (e.g., the single mode forwarding operation 100) at the edge of the ICN or at an access portion (at edge or access routers) of the network. As such, the statefull mode implementation 1110 may forward interest and data at the edge or peripheral of the network using PIT operations as described above. Using the PIT operations at the edge or network access region may be useful to suppress denial-of-service (DOS) attacks and/or distributed DOS (DDOS) attacks at the edge of the network. The state-less mode implementation 1120 may use a dual-mode forwarding operation, such as the dual-mode forwarding operation 300, at the core or backbone of the ICN (at core or backbone routers). As such, the state-less mode implementation 1120 may forward interest and data for conversational traffic at the network core region the FIB without using the PIT and CS, which may resolve the PIT scalability issue for shareable conversational traffic as described above. By using both the statefull mode implementation 1110 (single mode or non-expedite (default) forwarding) and the state-less mode implementation 1120 (dual-mode or expedite forwarding), the hybrid-mode forwarding implementation 1100 may provide a compromise or balance between the advantages of the PIT operations (at the network edge) and resolving the PIT scalability issue (at the network core).

Figure 12:
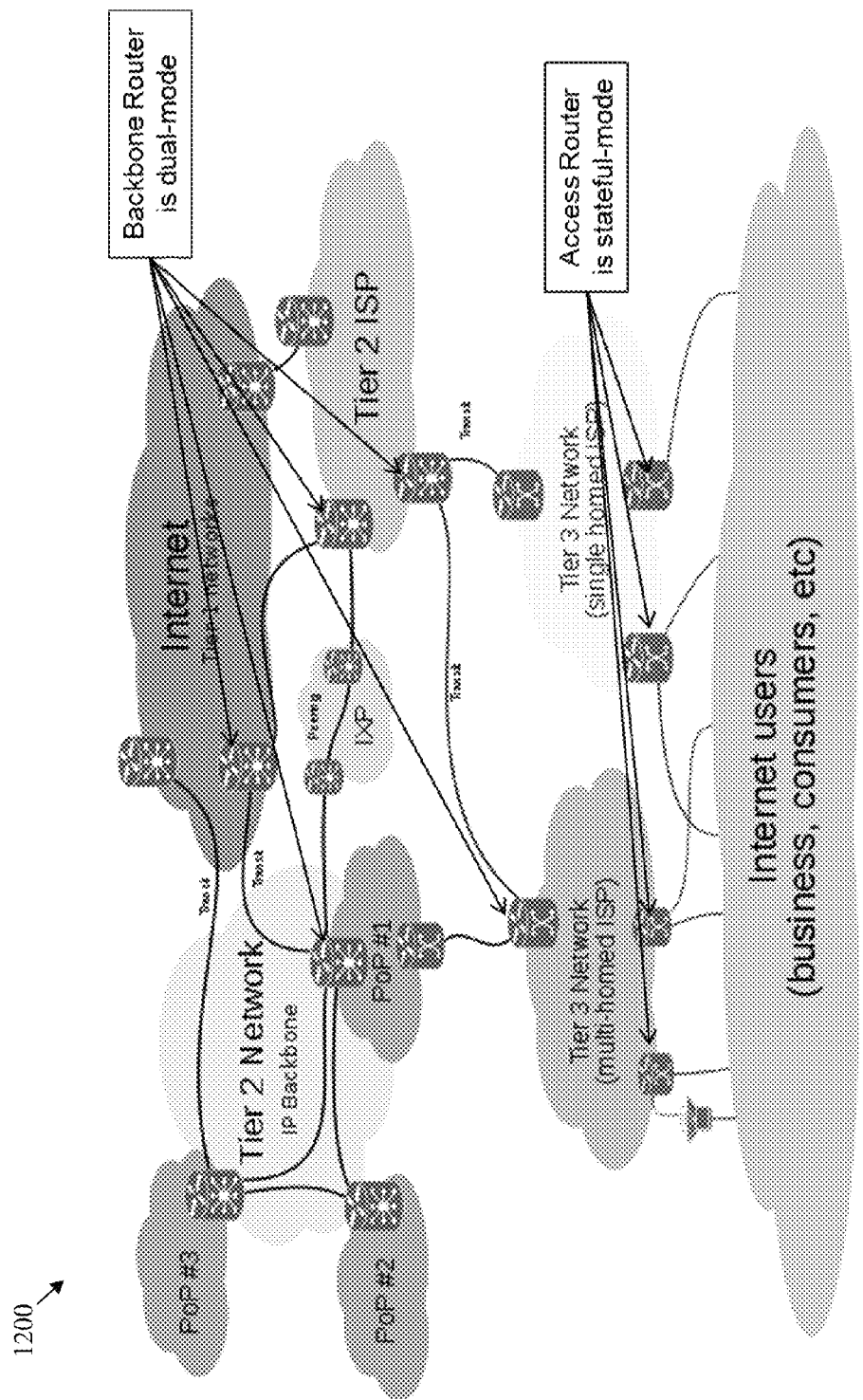
FIG. 12 is a schematic diagram of an embodiment of a hybrid-mode forwarding scenario.

FIG. 12 shows an embodiment of a hybrid-mode forwarding scenario 1200, which may use the hybrid-mode forwarding implementation 1100 in a networking system, such as an ICN or CCN. The networking system may comprise a plurality of networks (e.g., ICNs), which may comprise one or more tier one networks, one or more tier two networks, and one or more tier three networks, e.g., similar to the networks in the single mode forwarding scenario 200. The tier one and tier two network may correspond to the backbone portion of the networking system. The tier three networks may correspond to the access portion of the networking system and may be coupled to a plurality of content users (consumers) or subscribers. The tier networks may comprise a plurality of content routers that may comprise corresponding PITs (with corresponding CSs and FIBs), such as the content router 101.

The scenario 1200 shows a plurality of content routers, e.g., edge routers, across the networking system. The routers may comprise backbone routers, e.g., between the tier one and tier two networks and between the tier two and the tier three networks, where the scalability of the PIT may be an issue (when the number of forwarded non-sharable conversational traffic is substantially large). To overcome this issue, the backbone routers may use the dual-mode forwarding operation 300 (or state-less mode implementation 1120) for forwarding interest and data traffic. Specifically, the conversational traffic may be forwarded (at the networking system backbone portion) in expedite mode using the FIB, and the content dissemination traffic may be forwarded in non-expedite mode using the CS, PIT, and FIB, as described above. The routers may also comprise access routers, e.g., between the tier three networks and the users, where the security of the networking system may be a concern, such as against DOS, DDOS, or replay attacks. Hence, the access routers may use the single mode forwarding operation 100 (or statefull mode implementation 1110) for forwarding interest and data traffic. Specifically, content traffic may be forwarded (at the networking system access portion) in default or non-expedite mode using the CS, PIT, and FIB, as described above.

Figure 13:
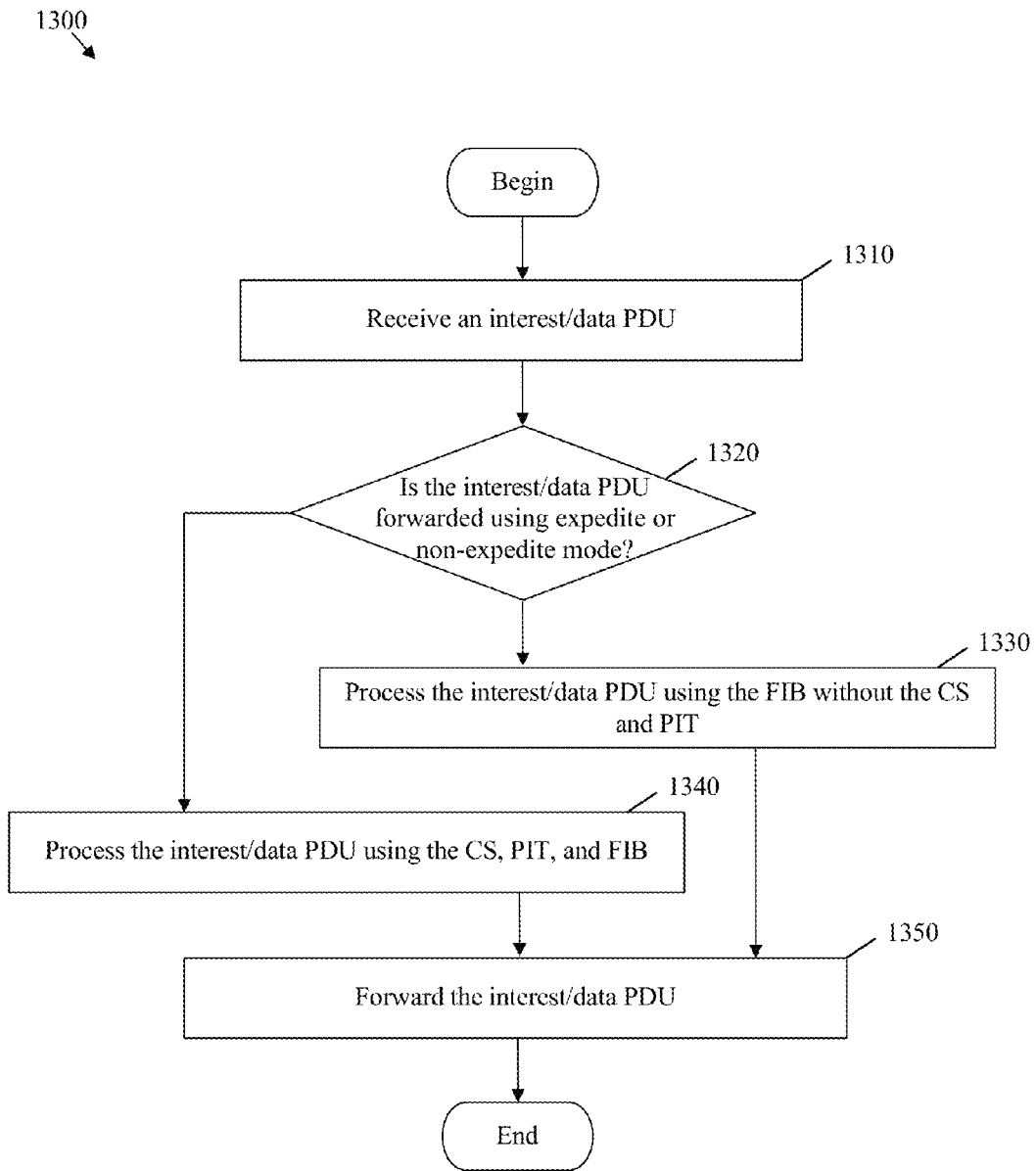
FIG. 13 is a flowchart of an embodiment of a dual-mode mode forwarding method.

FIG. 13 illustrates an embodiment of a dual-mode forwarding method 1300 that may be used for forwarding interest and data for both non-shareable conversational traffic and shareable content dissemination traffic in an ICN. The dual-mode forwarding method 1300 may be implemented by a content router or a node in the ICN, such as the content router 301. The method 1300 may begin at block 1310, where an interest/data PDU may be received. For example, the content router may receive and interest PDU similar to the PDU format 400 or may receive a data PDU similar to the PDU format 500, e.g., in response to a previously received interest. At block 1320, the method 1300 (at the content router) may determine whether the interest/data PDU is forwarded using expedite or non-expedite mode. For example, the content router may check the forwarding mode field 420 in the interest PDU format 400 or the forwarding mode field 520 in the data PDU format 500 to determine whether a flag is set to indicate that the PDU is forwarded using expedite mode (for conversational traffic) or non-expedite mode. The expedite mode may be set if the traffic is non-shareable or conversational traffic. Otherwise, the non-expedite mode may be used. If the condition in block 1320 is true, then the method 1300 may proceed to block 1330. Otherwise, the method 1300 may proceed to block 1340.

At block 1330, the interest/data PDU may be processed using the FIB without the CS and PIT, e.g., as described above for expedite mode in the dual-mode forwarding plane operation 300. The method 1300 may then proceed to block 1350. At block 1340, the interest/data PDU may be processed using the CS, PIT, and FIB, e.g., as described above for the default non-expedite mode in the typical single mode forwarding plane operation 100. In this case, at least a portion of the content (or payload) of the received data PDU may be cached at the content router (e.g., at the CS). At block 1350, the interest/data PDU may be forwarded, e.g., to the next hop in the network. The method 1300 may then end.

Figure 14:
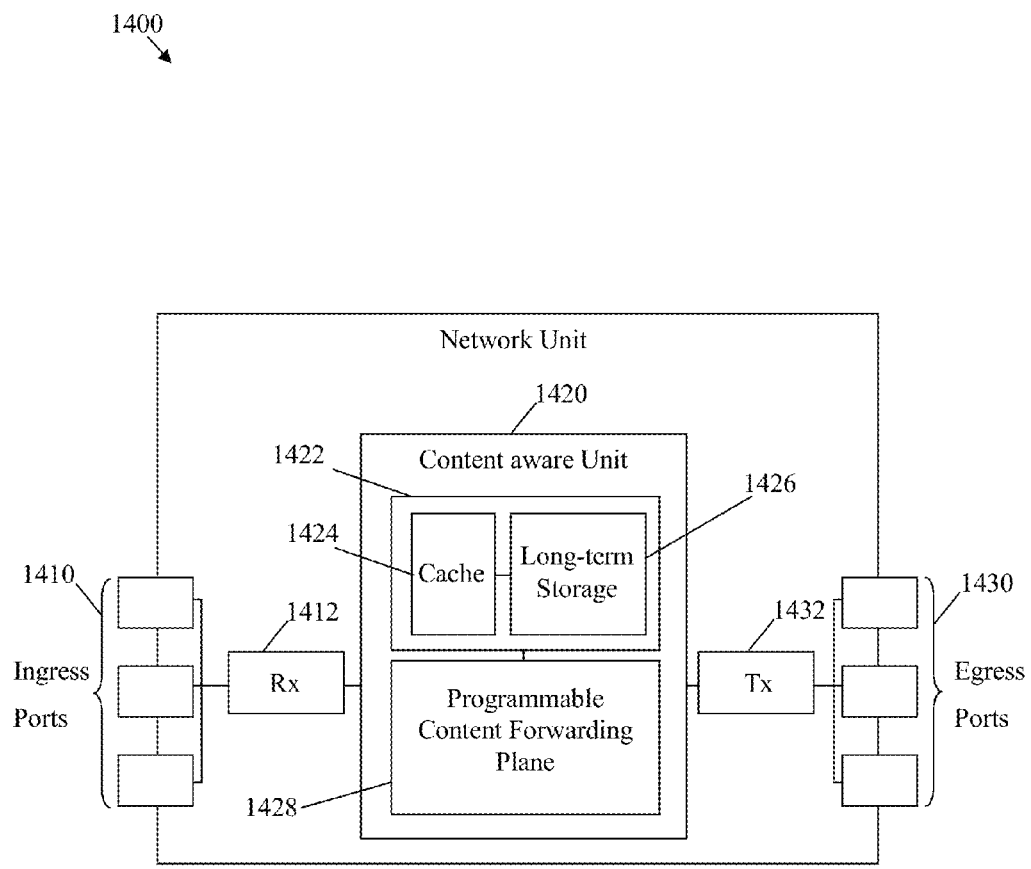
FIG. 14 is a schematic diagram of an embodiment of a network unit.

FIG. 14 illustrates an embodiment of a network unit 1400, which may be any device that transports and processes data through a network. For instance, the network unit 1400 may correspond to the content router 301 or may be located in a content router or any node in the ICN. The network unit 1400 may also be configured to implement or support the schemes and methods described above. The network unit 1400 may comprise one or more ingress ports or units 1410 coupled to a receiver (Rx) 1412 for receiving signals and frames/data from other network components. The network unit 1400 may comprise a content aware unit 1420 to determine which network components to send content to. The content aware unit 1420 may be implemented using hardware, software, or both. The network unit 1400 may also comprise one or more egress ports or units 1430 coupled to a transmitter (Tx) 1432 for transmitting signals and frames/data to the other network components. The receiver 1412, content aware unit 1420, and transmitter 1432 may also be configured to implement at least some of the disclosed schemes and methods above, which may be based on hardware, software, or both. The components of the network unit 1400 may be arranged as shown in FIG. 14.

The content aware unit 1420 may also comprise a programmable content forwarding plane block 1428 and one or more storage blocks 1422 that may be coupled to the programmable content forwarding plane block 1428. The programmable content forwarding plane block 1428 may be configured to implement content forwarding and processing functions, such as at an application layer or L3, where the content may be forwarded based on content name or prefix and possibly other content related information that maps the content to network traffic. Such mapping information may be maintained in one or more content tables (e.g., CS, PIT, and FIB) at the content aware unit 1420 or the network unit 1400. The programmable content forwarding plane block 1428 may interpret user requests for content and accordingly fetch content, e.g., based on meta-data and/or content name (prefix), from the network or other content routers and may store the content, e.g., temporarily, in the storage blocks 1422. The programmable content forwarding plane block 1428 may then forward the cached content to the user. The programmable content forwarding plane block 1428 may be implemented using software, hardware, or both and may operate above the IP layer or L2.

Further, the programmable content forwarding plane block 1428 may implement the dual-mode forwarding scheme or the hybrid-mode forwarding scheme described above. In the case of the hybrid-mode forwarding scheme, the programmable content forwarding plane block 1428 may implement the dual-mode forwarding scheme (without using the PIT) if the network unit 1400 is located at the backbone of the network, or the single mode forwarding scheme (using the PIT) if the network unit 1400 is located at the access portion of the network. The storage blocks 1422 may comprise a cache 1424 for temporarily storing content, such as content that is requested by a subscriber. Additionally, the storage blocks 1422 may comprise a long-term storage 1426 for storing content relatively longer, such as content submitted by a publisher. For instance, the cache 1424 and the long-term storage 1426 may include Dynamic random-access memories (DRAMs), solid-state drives (SSDs), hard disks, or combinations thereof.

Figure 15:
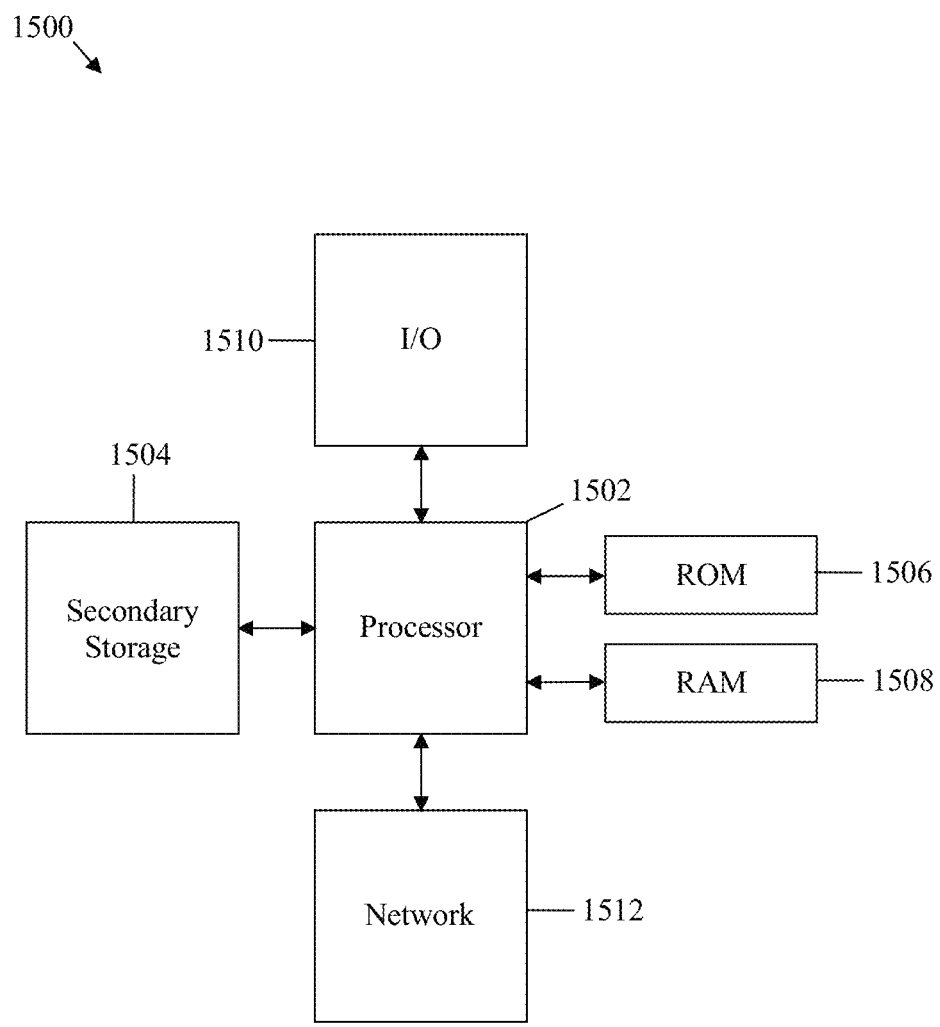
FIG. 15 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 15 illustrates a typical, general-purpose network component 1500 suitable for implementing one or more embodiments of the components disclosed herein. The network component 1500 includes a processor 1502 (which may be referred to as a central processor unit or CPU) that is in communication with memory devices including secondary storage 1504, read only memory (ROM) 1506, random access memory (RAM) 1508, input/output (I/O) devices 1510, and network connectivity devices 1512. The processor 1502 may be implemented as one or more CPU chips, or may be part of one or more application specific integrated circuits (ASICs).

The secondary storage 1504 is typically comprised of one or more disk drives or tape drives and is used for non-volatile storage of data and as an over-flow data storage device if RAM 1508 is not large enough to hold all working data. Secondary storage 1504 may be used to store programs that are loaded into RAM 1508 when such programs are selected for execution. The ROM 1506 is used to store instructions and perhaps data that are read during program execution. ROM 1506 is a non-volatile memory device that typically has a small memory capacity relative to the larger memory capacity of secondary storage 1504. The RAM 1508 is used to store volatile data and perhaps to store instructions. Access to both ROM 1506 and RAM 1508 is typically faster than to secondary storage 1504.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A networking system comprising:
a content router for an information-centric network (ICN) comprising a content store (CS), a pending interest table (PIT), a forwarding information base (FIB), and a plurality of interfaces, and configured to receive and forward interest from one or more users and data from one or more applications via the interfaces using a dual-mode data forwarding plane; and
a plurality of next hop nodes of the ICN coupled to the content router and configured to forward the interest and data to the content router via the interfaces,
wherein the dual-mode forwarding plane forwards the interest and data using the FIB without the CS and PIT for conversational traffic and using the CS, PIT, and FIB for content dissemination traffic.

2. The networking system of claim 1, wherein the conversational traffic is distinguished from the content dissemination traffic using an interest protocol data unit (PDU) and a data PDU that each comprises a forwarding mode indicator that is set to expedite mode for conversational traffic or to non-expedite mode for content dissemination traffic.

3. The networking system of claim 2, wherein the data PDU is set by an application, and wherein the interest PDU is set by a user.

4. The networking system of claim 1, wherein the interest and data for conversational traffic is forwarded without caching or storing content data in the content router.

5. The networking system of claim 1, wherein the content router is an edge router located at a backbone portion of the networking system.

6. The networking system of claim 5, wherein at least some of the next hop nodes are located at the backbone portion and are also configured to forward interest and data using the dual-mode data forwarding plane.

7. The networking system of claim 5, wherein at least some of the next hop nodes are coupled to the users at an access portion of the networking system and are configured to forward interest and data for both conversational traffic and content dissemination traffic using the PIT.

8. A network component comprising:
a transmitter/receiver (transceiver) configured to receive and forward an interest protocol data unit (PDU) and a data PDU that indicate a forwarding mode;
a memory comprising a content store (CS) for caching content, a pending interest table (PIT) for tracking pending requests for content, and a forwarding information base (FIB) for associating content with one or more ports; and
a processor configured to forward the interest PDU and the data PDU for sharable content traffic in non-expedite mode using the PIT and to forward the interest PDU and the data PDU for non-sharable content traffic in expedite mode using the FIB without the PIT.

9. The network component of claim 8, wherein the interest PDU comprises a message type that indicates an interest PDU, a forwarding mode indicator that is set to expedite mode for non-sharable content traffic or to non-expedite mode for sharable content traffic, a source object name that indicates a requesting object, a destination object name that indicates a requested object, a checksum value that is used to verify the integrity of the interest PDU, a time to live (TTL) indicator that determines the life of the interest PDU, a signature that is used to verify a relationship between the destination object name and the interest PDU, a nonce that is used to prevent replay attacks, a meta data array indicating a list of context-based parameters or computing functions, and an interest payload.

10. The network component of claim 9, wherein the meta data array comprises at least one of a self-certified alias that is used to validate a match between the data PDU and the interest PDU, a device type that indicates the type of the requesting object, a global positioning system (GPS) indicator that indicates the geographic location of the requesting object, a selector that allows the content router to implement one or more designated functions associated with the data PDU, other values including a secured community identifier (ID) that is used to authorize access control policy.

11. The network component of claim 9, wherein the TTL indicator is used to prevent a forwarding loop in expedite mode for non-sharable content traffic or to indicate how long the interest PDU remains valid in the PIT, CS, or both in non-expedite mode for sharable content traffic, and wherein the TTL indicator is set as a number of maximum allowed hops in expedite mode or as a unit of time-of-the-day (TOD) in non-expedite mode.

12. The network component of claim 9, wherein the non-sharable content traffic is routed using the source object name and the destination object name in expedite mode, and wherein the sharable content traffic is forwarded using the destination object name in non-expedite forwarding mode.

13. The network component of claim 9, wherein the forwarding mode indicator is temporarily set to non-expedite mode by a non-sharable application to enable content caching and support seamless mobility for a mobile device.

14. The network component of claim 13, wherein both the source object name and the destination object name are used for mobility control to allow a seamless anchoring point to cache data for the non-sharable application and allow the non-sharable application to retrieve the cached data after the mobile device has re-anchored to a new point-of-attachment.

15. The network component of claim 9, wherein the source object name and the destination object name are structured names that have a hierarchical format.

16. The network component of claim 9, wherein the source object name and the destination object name are flat names that have a digital format.

17. The network component of claim 9, wherein the data PDU comprises a message type, a forwarding mode indicator, a source object name, a destination object name, a checksum value, a TTL indicator, a signature, and a meta data array that are configured substantially similar to the corresponding components of the interest PDU, and a data payload.

18. A method implemented by a network component for forwarding interest and data traffic in an information-centric network (ICN), comprising:
  receiving via a receiver content interest or data;
  forwarding via a transmitter the content interest or data using a pending interest table (PIT) if the content or interest data corresponds to content dissemination traffic; and
  forwarding via the transmitter the content interest or data using a forwarding information base (FIB) without the PIT if the content or interest data corresponds to conversational traffic.

19. The method of claim 18, wherein the conversational traffic is routed using the FIB that comprises a plurality of application prefixes published by a plurality of requesters, and wherein the content dissemination traffic is forwarded using the PIT lookup.

20. The method of claim 18 further comprising:
  forwarding the content or interest data corresponding to conversational traffic using the FIB without the PIT if the network component is located in a backbone portion of the ICN; and
  forwarding the content or interest data corresponding to conversational traffic using the PIT if the network component is located in an access portion of the ICN.

* * * * *